United States Patent

Johansson et al.

[11] Patent Number: 5,808,053
[45] Date of Patent: Sep. 15, 1998

[54] MODIFICATON OF STARCH

[75] Inventors: Hans Johansson, Kungälv; Tomas Lund, Romelanda; Ake Larsson, Karlstad, all of Sweden

[73] Assignee: Eka Chemicals AB, Bohus, Sweden

[21] Appl. No.: 785,642

[22] Filed: Jan. 17, 1997

Related U.S. Application Data

[60] Provisional application No. 60/011,000, Feb. 1, 1996.

[30] Foreign Application Priority Data

Jan. 26, 1996 [SE] Sweden .................................. 9600285

[51] Int. Cl.$^6$ .............................. C07H 1/00; C08B 31/00
[52] U.S. Cl. ........................... 536/124; 536/102; 536/111
[58] Field of Search .................................... 536/102, 111, 536/124

[56] References Cited

U.S. PATENT DOCUMENTS

| | | | |
|---|---|---|---|
| 3,136,646 | 6/1964 | Elizer et al. | 106/210 |
| 3,640,842 | 2/1972 | Hullinger et al. | 162/175 |
| 4,040,862 | 8/1977 | Voigt et al. | 127/70 |
| 5,294,301 | 3/1994 | Kumar et al. | 162/168.1 |

FOREIGN PATENT DOCUMENTS

| | | | |
|---|---|---|---|
| 0 303 039 | 2/1989 | European Pat. Off. | C08B 31/12 |
| 0 490 425 | 3/1994 | European Pat. Off. | D21H 17/68 |
| 0 701 201 | 3/1996 | European Pat. Off. | D21H 23/16 |
| 63-275794 | 11/1988 | Japan . | |

OTHER PUBLICATIONS

*Nordic Pulp and Paper Research Journal No. Jan. 1993,* Starch and alumina/silica based compounds as microparticle retention aid system, pp. 21–26.
Abstract, 68–65533, 1968 (CA 739365).
Abstract, 94–147676, Apr. 5, 1994 (JP 6092629).

*Primary Examiner*—Douglas W. Robinson
*Assistant Examiner*—Everett White
*Attorney, Agent, or Firm*—Ralph J. Mancini

[57] ABSTRACT

The invention generally relates to a process for modification of cationic starch at which the cationic starch is treated, in the presence of water, with an aluminium compound. The modified cationic starch is useful as a retention agent. The invention also relates to a method for improving retention and/or dewatering in papermaking at which cationic starch is modified by the process.

12 Claims, No Drawings

MODIFICATON OF STARCH

This present application claims priority of Swedish patent application no. 9600285-2 filed on Jan. 26, 1996 and benefit of U.S. provisional application no. 60/011,000 filed Feb. 1, 1996 under 35 U.S.C. §119.

FIELD OF THE INVENTION

The present invention relates to a process for modification of cationic starch, modified cationic starch obtainable from the process, and use of the modified cationic starch as a retention agent. It also relates to a method for improving retention and/or dewatering in a pulp or paper production process by incorporation of the cationic starch modification process.

BACKGROUND OF THE INVENTION

It is common general knowledge to add aluminium compounds and cooked aqueous starch solutions to the fibre suspension in a pulp or paper production process in order to improve retention or dewatering, but then, however, the compounds and solutions are added separate from each other, directly to the suspension.

U.S. Pat. No. 3,640,842 discloses treatment of starch with an aluminum salt. In that method, however, the treatment has to be carried out during cooking of the starch.

Furthermore, the treated starch is not indicated to be cationic; rather on the contrary, the treated starch is compared with cationic starches.

EP-A2-0 303 039, hereby incorporated by reference, discloses dry cationization of starch with nitrogen containing alkylene epoxides in the presence of a finely divided hydrophobic silicic acid and an alkaline substance which, among others, can be an alkali aluminate. In that process an aqueous solution of the alkylene epoxide is added to a substantially dry mixture of starch, silica, and the alkaline substance. The resulting composition, having the consistency of a wet mush, is stirred for up to 25 minutes at a temperature of up to 40° C. It is indicated that all epoxide added is consumed during the reaction. The obtained starch is indicated to be useful as a retention agent, among other things. Although the process is directed to cationization, the obtained epoxide-modified starch may, due to the optional use of aluminate as an activator, contain some aluminium. However, regarded as a method for incorporation of aluminium into starch, the disclosed process has a number of drawbacks. Epoxides are highly reactive substances and are thus hazardous to health and environment. Furthermore, this modification process is not easily incorporated into any conventional paper process; it is rather likely to be carried out separately from the paper mill, thus involving complicated technology and significant costs with regard to the overall paper production.

EP 0 490 425 discloses production of paper sheets from a suspension of cellulose containing fibres to which is added anionic inorganic particles, such as bentonite and silica based particles, and cationic starch containing aluminium. The aluminium-containing starches disclosed in the specification are all produced according to the teachings of EP-A2-0 303 039 (see supra), and thus the drawbacks associated with the starch modification are the same as above.

The problem to be solved by the present invention is to provide a process for modification of cationic starch, which process is not associated with the drawbacks indicated above. This problem is solved by the invention as defined by the appended claims.

SUMMARY OF THE INVENTION

The present invention generally relates a process for modification of cationic starch, which comprises treating said cationic starch is treated, in the presence of water, with an aluminium compound, with the proviso that if the aluminium compound is an alkali aluminate and the treatment is carried out in an alkaline medium at a temperature of between 5° and 40° C. no alkylene epoxide is present. The invention also relates to a method for improving retention and/or dewatering in a pulp or papermaking process.

DETAILED DESCRIPTION OF THE INVENTION

The present invention generally relates a process for modification of cationic starch, which comprises treating said cationic starch, in the presence of water, with an aluminium compound, with the proviso that if the aluminium compound is an alkali aluminate and the treatment is carried out in an alkaline medium at a temperature of between 5° and 40° C. no alkylene epoxide is present. The invention also relates to a method for improving retention and/or dewatering in a pulp or papermaking process. More particularly, by premixing cationic starch and an aluminium compound, instead of adding them separate from each other as in an ordinary paper process, the dewatering and/or retention effect of the added amount of aluminium compound is significantly improved. Apart from improved dewatering and retention characteristics the present modification process also provides for increased strength of pulp and paper produced with the process applied.

Among aluminium compounds usable in the present modification process are, but not limited to these, any at paper production per se known aluminium compound, for example alum, aluminates, aluminium chloride, aluminium nitrate and polyaluminium compounds such as polyaluminium chloride, polyaluminium sulphate, polyaluminium compounds containing both chloride and sulphate ions, and polyaluminium silicate sulphate. The present modification process is well adapted to any conventional paper process, and is quite straightforward when compared to the prior art modification process.

The cationic starch used can be based on any kind of starch, such as potato, wheat, corn, barley, oat, rice and tapioca starch and mixtures of different types of starch. It may furthermore contain anionic groups. It is preferred to use cationic starch containing anionic groups such as e.g. phosphate, sulphate, or carboxylate groups. An especially preferred type of cationic starch is cationic potato starch. As an alternative, the cationic starch to be modified by the present process may be obtained from the process set forth in EP-A2-0 303 039 (supra).

In a preferred embodiment of the present modification process cationic starch is suspended in water to give an aqueous slurry which is cooked, e.g. by batch cooking at a solids content of up to about 10 percent by weight and a temperature of about 90°–100° C. for about 10–30 minutes, or in a jet cooker under pressure at a solids content of up to about 25 percent by weight and a temperature of at about 110°–140° C. for a few seconds.

The aluminium compound may be mixed with the cationic starch in any suitable way. It may for instance be already present in an aqueous solution to which dry cationic starch is added, or be added simultaneously or after the cationic starch to an amount of water, either in dry form or dissolved in water. Furthermore, in those embodiments of the present invention that involve cooking of the cationic starch, it may be present in the aqueous slurry prior to cooking, or it may be added during the cooking process or to the cationic starch solution after cooking, even when the solution has cooled. In the present context the concept of "cooking" comprises "heating" as well as "warming" and "boiling". In a paper mill, the aluminium substance may advantageously be mixed with the cooked cationic starch solution when the latter is pumped through a pipe to the fibre suspension by adding the former through a connecting pipe. However, the modified cationic starch obtained by the present process may also be stored as cooked prior to being used in the paper mill.

The cationic starch used is preferably cooked when used in papermaking as it has been found that this gives an optimum effect. Cooking is also advantageous from a technical point of view and with regard to handling. The obtained aqueous solutions of cationic starch are normally diluted to a solids content within the range of from about 0.1 to about 3 per cent by weight before they are added to the fibre suspension. The solutions of the aluminium-containing cationic starch can have a pH of from about 3 and up to about 10, measured on a 2% solution, and is preferably from about 4 to about 9.

The Al-content of the cationic starch is preferably at least about 0.005%, more preferably at least about 0.01%, and most preferably at least about 0.05%, calculated on basis of dry cationic starch. The upper limit is primarily depending on practical and/or economical considerations.

The present invention also relates to modified cationic starch obtainable by the present modification process.

As indicated above, cationic starch obtained by the cationisation method disclosed in EP-A2-0 303 039 may be either aluminium-containing or not, depending upon if the activator used is an aluminate or one of the alternative alkaline activators. It would thus seem plausible that starch cationized according to EP-A2-0 303 039, but without any aluminate (below denoted "NA-treated starch"), and then modified according to the present process, could have the same characteristics as a starch of the same kind but cationized according to EP-A2-0 303 039 while actually using aluminate (below denoted "A-treated starch"). However, experiments have shown that at least with regard to viscosity, the impact of the present process on NA-treated cationic starch is tremendous; the viscosity of the treated cationic starch is far higher than that of an A-treated cationic starch. Surprisingly, even if the latter cationic starch is modified according to the present process, the viscosity of the resulting cationic starch is still much lower than for corresponding modified NA-treated cationic starch. This results indicate that a NA-treated cationic starch, modified according to the present process, is different from a corresponding A-treated cationic starch.

The present invention also relates to a method for improving retention and/or dewatering in a process for production of cellulose fibre-containing products in sheet or web form, and hereby is primarily intended paper, including board, cardboard, and pulp sheets, by using cationic starch modified according to the present invention. At the production of these products it is important to have both as good retention of fine fibres and optional fillers as is possible and as high speed of dewatering as possible in order to be able to increase the speed of the machine. The present method gives enhanced retention as well as enhanced dewatering. Pulp sheets are intended for the further production of paper. Production of pulp sheets is carried out starting from a suspension of cellulose containing fibres, normally with dry contents of from about 1 to about 6 per cent by weight, which is dewatered on a wire and dried. Pulp sheets are usually free from fillers and usually no chemicals are added, except for optional retention and dewatering improving substances, at the production of the sheets.

The present method is particularly suitable in a process for the production of paper. At the production of paper a number of different chemical agents are usually added to the fibre suspension, which also is known as the stock or the furnish. The stock generally has a dry content within the range of from about 0.1 to about 6 per cent by weight and the suspension often contains fillers. The cationic starch modified according to the present invention can be used at the production of paper from different types of stocks of cellulose-containing fibres and the stocks should suitably contain at least 50 per cent of such fibres, based on dry material. The components can for example be used as additives to stocks of fibres from chemical pulp, such as sulfate and sulphite pulp, chemi-thermomechanical pulp (CTMP), thermomechanical pulp, refiner mechanical pulp or groundwood pulp from as well hardwood as softwood and can also be used for stocks containing recycled fibres. The stocks can also contain mineral fillers of conventional kinds, such as for example kaolin, titanium dioxide, gypsum, calcium carbonate or talcum. The paper production according to the invention can be carried out within a wide pH range, from about 3.5 to about 10, but is preferably carried out within a pH range of about 5 to about 8.

Both at the production of pulp sheets and paper additional retention agents can be used, for example cationic polyacrylamides, polyethyleneimines, poly(diallyl-dimethyl-ammonium chloride), polyamines, and polyamidoamines.

At the production of paper according to the present invention other paper chemical additives, that are commonly used, can of course also be used, such as hydrophobing agents, dry strength agents, e.g. starch, wet strength agents, anionic trash catchers etc. It is particularly suitable to use aluminium compounds as additives to the stock to further increase the retention and dewatering effects. Any at paper production per se known aluminium compound can be used, for example alum, aluminates, and polyaluminium compounds such as polyaluminium chloride, polyaluminium sulphate, polyaluminium compounds containing both chloride and sulphate ions, and polyaluminium sulphate silicate. The aluminium compound is added directly to the suspension prior to, simultaneously with, or after addition of the present modified cationic starch to the suspension. The proportion between the amount of aluminum (calculated as elementary Al) added directly to the suspension and the amount of aluminum added with the modified cationic starch is preferably 1000:1–1:50, most preferably 500:1–1:20.

Inorganic particles, especially anionic ones, may advantageously be used together with the modified cationic starch in the stock to improve retention and dewatering. The anionic inorganic particles which are preferably used are previously known for use in papermaking. As examples of such can be mentioned swellable colloidal smectite type clays such as bentonite, titanyl sulphate and different silica based particles. Bentonites and silica based particles are preferred. The inorganic particles are added to the cellulose fibre containing suspension in the form of aqueous dispersions. Bentonites such as disclosed in the European patent application 235893 are suitable. Suitable silica based sols to be used according to the present invention are such which are disclosed in EP 41056, WO 86/00100, WO 91/07350, WO 91/07351, EP 348366, EP 359552, WO 89/06637, WO 94/05595, and WO 95/23021, all incorporated herein by reference.

The modified cationic starch is usually used in amounts of at least 0.1 kg/t, calculated as dry on dry fibres and optional fillers. Suitably amounts of from 0.5 to 50 kg/t and preferably from 1 to 20 kg/t are used. Usually the weight ratio of the modified cationic starch to the inorganic material should be at least 0.01:1 and suitably at least 0.2:1. The upper limit for the modified cationic starch is primarily decided by economy. In a preferred embodiment of the present invention the weight ratio of the modified cationic starch to the inorganic material ranges from about 1:1 to about 30:1. It is most suitable to add the modified cationic starch to the fibre suspension before the inorganic particles, although reversed order of addition can be used.

The invention is further illustrated in the following examples which, however, are not intended to limit the same. Parts and percentages relate to parts by weight and per cent by weight, respectively, unless otherwise stated. The unit kg/t is calculated as dry on dry fibres and optional fillers, and by a "ton" is meant a metric ton.

Example 1

In this Example the retention of fillers and fine fibres was measured. The furnish was a standard stock with a 60/40 mixture of bleached birch sulphate pulp and bleached pine sulphate pulp and with 30% of chalk. 0.3 g/l of $Na_2SO_4 \cdot 10H_2O$ had been added to the stock which had a pH of 7.5 (natural pH). The stock concentration was 5.1 g/l and the fines fraction content was 41%. For measuring the retention a baffled "Britt Dynamic Drainage Jar" (abbreviated DDJ) was used, and this is the conventional method for evaluating retention in the paper industry. In all tests 1 kg/t of a polyaluminium chloride (PAC) was added to the stock followed by 5 kg/t of cationic starch 50 seconds later, optionally followed by 0.5 kg/t of anionic inorganic particles after yet another 20 seconds. 5 seconds after the last addition the stock was transferred to the DDJ and drained. The cationic starch used was a conventional medium-high cationized potato starch having a degree of substitution of 0.042. The PAC used was Ekoflock, produced and sold by Eka Chemicals AB in Sweden. The anionic inorganic partides consisted of a silica sol the particles of which had a specific surface area of about 890 $m^2/g$ and which were aluminium modified to a degree of 7%. The sol had an S-value of 30%. The cationic starch was slurried in water to a concentration of about 6% and cooked in a lab jet cooker at 120° C. for about 9 seconds and then diluted to 2%. In some of the tests alum was added to the cationic starch in an amount of 0.8%. 0.24% sodium aluminate, corresponding to 0.8% alum with regard to Al-content, was added to the cationic starch in some of the tests. The results of the retention tests are shown in Table I.

TABLE 1

| Test # | Al-compound added to cationic starch, before or after cooking | Silica sol added to stock | DDJ fines fraction content, % |
|---|---|---|---|
| 1 | no | no | 30.6 |
| 2 | yes, alum after | no | 41.4 |
| 3 | no | yes | 45.5 |

TABLE 1-continued

| Test # | Al-compound added to cationic starch, before or after cooking | Silica sol added to stock | DDJ fines fraction content, % |
|---|---|---|---|
| 4 | yes, alum after | yes | 54.1 |
| 5 | yes, alum before | yes | 56.5 |
| 6 | yes, sodium aluminate after | yes | 49.3 |

As can be seen in Table I, test #2 gave better result than corresponding comparative test according to prior art, test #1. Similarly test #4–6 gave better results than corresponding comparative test according to prior art, test #3.

Example 2

In this Example the strength of paper produced using cationic starch modified according to the present process is compared to conventionally produced paper. The initial stock had the same composition as in Example 1, except that the chalk content was 20%. The stock concentration was 3 g/l. Paper sheets were formed using a dynamic sheet former (Formette Dynamique), and the used amount of stock was chosen so as to give the final dried sheet a weight or grammage of about 70 $g/m^2$. The sheets were tested with regard to tensile index according to standard method SCAN P16:76 and with regard to burst index according to SCAN P24:77. In Table II MD and CD mean Machine Direction and Cross Direction, respectively, as is common within this technical field. In all tests 10 kg/t of cationic starch was added to the stock 30 seconds before the stock was pumped into the spray device of dynamic sheet former, optionally followed by 0.5 kg/t of anionic inorganic particles, which were added to the stock about 5 seconds before it was pumped. Cationic starch and inorganic particles were of the same kind as used in Example 1. The cationic starch was cooked as in Example 1. Alum was added to the cationic starch in an amount of 0.8%. The results of the strength tests are shown in Table II.

TABLE II

| Test # | Alum added to cationic starch, before or after cooking | Silica sol added to stock | Tensile Index, kNm/kg $\sqrt{MD \times CD}$ | Burst Index, $kPam^2/g$ |
|---|---|---|---|---|
| 1 | no | no | 55.7 | 3.56 |
| 2 | before | no | 57.6 | 3.9 |
| 3 | after | no | 57.7 | 3.84 |
| 4 | no | yes | 54.4 | 3.55 |
| 5 | before | yes | 56.5 | 4.03 |
| 6 | after | yes | 58.9 | 3.79 |

Test #1 and 4 represent prior art, i.e. not using cationic starch with aluminium compound admixed, and as can be seen in Table II the corresponding tests according to the present invention all give better results with regard to tensile index as well as burst index.

Example 3

In this Example the effect on dewatering during paper production by using cationic starch modified according to the present process is compared with dewatering when using a prior art method. The initial stock had the same composition and concentration as in Example 2, except that the chalk content was 30%. The dewatering effect was evaluated by means of a "Canadian Standard Freeness (CSF) Tester", which is the conventional method for characterization of dewatering or drainage capability, according to SCAN-C 21:65. All additions of chemicals were made at a mixing speed of 1000 rpm in a DDJ apparatus (see Example 1) and the stock system was then transferred to the Canadian Standard Freeness Tester apparatus. In the tests Ekoflock was added to the stock about 30 seconds prior to adding 8 kg/t of cationic starch to the stock, which was done about 20 seconds before dewatering. 1 kg/t of silica sol was added to the stock in some of the tests, about 10 seconds before dewatering. The cationic starch and silica sol used were of the same kind as in Example 1. The cationic starch was cooked as in Example 1. Ekoflock was added to the cationic starch in some of the tests as set forth in Table III. The results of the dewatering tests are shown in Table III.

TABLE III

| Test # | Total amount of $Al_2O_3$ added (to stock and cationic starch), kg/t | Ekoflock addded to stock, as kg $Al_2O_3$/t | Ekoflock added to cationic starch, as kg $Al_2O_3$/t | Silica sol added to stock | CSF, ml |
|---|---|---|---|---|---|
| 1 | 0.4 | 0.4 | — | no | 510 |
| 2 | 0.6 | 0.4 | 0.2 | no | 560 |
| 3 | 0.8 | 0.8 | — | no | 540 |
| 4 | 0.8 | 0.4 | 0.4 | no | 545 |
| 5 | 0.8 | 0.8 | — | yes | 610 |
| 6 | 0.6 | 0.4 | 0.2 | yes | 645 |

As can be seen in Table III the tests according to the present invention gave improved dewatering results when compared with the results of prior art tests #1, 3, and 5.

Example 4

As in Example 3 the effect of the present modified cationic starch on dewatering during papermaking is compared with a prior art method. The initial stock had the same composition and concentration as in Example 3. The dewatering effect was evaluated as in Example 3. Furthermore, the turbidity of the white water was determined by means of turbidimeter, model HACH 2100A. In this Example alum was added either to the stock, about 45 seconds prior to dewatering, or to the cationic starch. 8 kg/t of cationic starch was added to the stock about 15 seconds before dewatering. In tests #5–7 1 kg/t of silica sol was added about 7 seconds before dewatering. The cationic starch and silica sol used was of the same kind as used in Example 1. The cationic starch was cooked as in Example 1. Alum was added to the cationic starch in some of the tests as set forth in Table IV. The results of the dewarting and turbidity tests are shown in Table IV.

TABLE IV

| Test # | Total amount of $Al_2O_3$ added (to stock and cationic starch), kg/t | Alum addded to stock, as kg $Al_2O_3$/t | Alum added to cationic starch, as kg $Al_2O_3$/t | Turbidity, NTU | CSF, ml |
|---|---|---|---|---|---|
| Stock + 8 kg cationic starch/t | — | — | — | 50 | 350 |
| 1 | 0.01 | 0.01 | — | 29 | 350 |
| 2 | 0.01 | — | 0.01 | 24 | 375 |
| 3 | 0.1 | 0.1 | — | 28 | 360 |
| 4 | 0.1 | — | 0.1 | 20 | 395 |
| 5 | — | — | — | 13 | 450 |
| 6 | 0.1 | 0.1 | — | 9 | 500 |
| 7 | 0.1 | — | 0.1 | 5 | 580 |

As can be seen in Table IV the tests according to the present invention gave clearly improved dewatering and turbidity results even at very low addition levels when compared with the results of the prior art tests.

Example 5

In this Example the effect of the aluminium content of the cationic starches modified according to the present invention on turbidity and CSF at a given level of Al in the stock was investigated. The initial stock had the same composition and concentration as in Example 3. Alum was added to the stock about 45 seconds prior to dewatering. 8 kg/t of cationic starch was added to the stock about 15 seconds before dewatering. In all tests 1 kg/t of silica sol was added about 7 seconds before dewatering. The cationic starch and silica sol used were of the same kind as in Example 1. The cationic starch was cooked as in Example 1. Alum was added to the cationic starch in amounts as set forth in Table V. The results of the dewarting and turbidity tests are shown in Table V.

TABLE V

| Test # | Alum added to cationic starch, as wt-% $Al_2O_3$ of cationic starch | Alum added to cationic starch, as kg $Al_2O_3$/t | Alum added to stock, as kg $Al_2O_3$/t | Turbidity, NTU | CSF, ml |
|---|---|---|---|---|---|
| 1 | — | — | 0.1 | 9 | 500 |
| 2 | 0.5 | 0,04 | 0.1 | 9 | 590 |
| 3 | 1.25 | 0.1 | 0.1 | 8 | 605 |
| 4 | 2.5 | 0.2 | 0.1 | 7 | 615 |
| 5 | 5.0 | 0.4 | 0.1 | 6 | 620 |
| 6 | — | — | 0.4 | 7 | 580 |
| 7 | 0.5 | 0.04 | 0.4 | 7 | 615 |
| 8 | 1.25 | 0.1 | 0.4 | 6 | 625 |
| 9 | 2.5 | 0.2 | 0.4 | 5 | 630 |
| 10 | 5.0 | 0.4 | 0.4 | 4 | 630 |

Example 6

The conditions prevailing in this Example were basically the same as in Example 5, except that the cationic starch used was a cationized potato starch comprising phosphate groups corresponding to a P-content of about 0.16%, i.e. about twice the P-content of native potato starch or the cationic starch used in the previous Examples. In tests #3–4 1 kg/t of silica sol was added about 7 seconds before dewatering. The results of the dewarting and turbidity tests are shown in Table VI.

TABLE VI

| Test # | Total amount of $Al_2O_3$ added (to stock and cationic starch), kg/t | Alum added to stock, as kg $Al_2O_3$/t | Alum added to cationic starch, as kg $Al_2O_3$/t | Turbidity, NTU | CSF, ml |
|---|---|---|---|---|---|
| Stock + 8 kg cationic starch/t | — | — | — | 53 | 310 |
| 1 | 0.1 | 0.1 | — | 40 | 315 |
| 2 | 0.1 | — | 0.1 | 21 | 390 |
| 3 | 0.1 | 0.1 | — | 14 | 510 |
| 4 | 0.1 | — | 0.1 | 11 | 515 |

As can be seen in Table IV the tests according to the present invention gave clearly improved dewatering and turbidity results when compared with the results of the prior art tests.

Example 7

In this Example the effect of the aluminium content of the cationic starches modified according to the present invention on turbidity and CSF at a given level of Al in the stock was investigated. The stock used was of the same kind as used in Example 5. Alum was added to the stock about 45 seconds prior to dewatering. 8 kg/t of cationic starch was added to the stock about 15 seconds before dewatering. The cationic starch used was the same as in Example 6. In all tests 1 kg/t of silica sol, same as in Example 1, was added about 7 seconds before dewatering.
The cationic starch was cooked as in Example 1. Alum was added to the cationic starch in amounts as set forth in Table VII. The results of the dewatering and turbidity tests are shown in Table VII.

TABLE VII

| Test # | Alum added to cationic starch, as wt-% $Al_2O_3$ of cationic starch | Alum added to cationic starch, as kg $Al_2O_3$/t | Alum added to stock, as kg $Al_2O_3$/t | Turbidity, NTU | CSF, ml |
|---|---|---|---|---|---|
| 1 | — | — | 0.1 | 14 | 510 |
| 2 | 0.5 | 0.04 | 0.1 | 11 | 580 |
| 3 | 1.25 | 0.1 | 0.1 | 9 | 590 |
| 4 | 2.5 | 0.2 | 0.1 | 9 | 590 |
| 5 | 5.0 | 0.4 | 0.1 | 10 | 570 |
| 6 | — | — | 0.4 | 11 | 545 |
| 7 | 0.5 | 0.04 | 0.4 | 7 | 600 |
| 8 | 1.25 | 0.1 | 0.4 | 7 | 603 |
| 9 | 2.5 | 0.2 | 0.4 | 8 | 595 |
| 10 | 5.0 | 0.4 | 0.4 | 10 | 580 |

Example VIII

Cationic starch produced according to the method disclosed in EP-A2-0 303 039 was used in this Example. Cationic starch A had been produced using sodium aluminate as an alkaline activator, and had an Al-content of about 0.6% $Al_2O_3$. A 2.5% solution of this cationic starch was prepared in a laboratory jet cooker at 130° C. pH was adjusted to 9.1. Cationic starches B, D, and F had been produced using a silicate as activator, and contained thus no Al from the outset of the experiment. 2.5% solutions of the cationic starches were prepared under the same conditions as cationic starch A, except that sodium aluminate was added to the cationic starches after cooking, resulting in Al-contents of about 0.5%, 1.0%, and 2.0%, respectively, of $Al_2O_3$. pH was measured to 8.2, 8.6, and 9.2, respectively. Cationic starches C and E had been produced using sodium aluminate as an alkaline activator, and had an initial Al-content of about 0.6% $Al_2O_3$. 2.5% solution of the cationic starches were prepared under the same conditions as cationic starch A, except that sodium aluminate was added to the cationic starches after cooking, resulting Al-contents of about 1.1% and 2.6%, respectively, of $Al_2O_3$. pH was measured to be 8.2 and 9.2, respectively. All solutions were kept at a temperature of about 22° C. Samples were taken from the solutions, and the viscosity of the samples were measured by means of a Brookfield RTV viscosimeter. The results of the experiment are set forth below in Table VIII.

TABLE VIII

| Cationic starch | Al-content, total, as % $Al_2O_3$ | pH | Viscosity, cps at 22° C. |
|---|---|---|---|
| A | 0.6 | 9.1 | 656 |
| B | 0.5 | 8.2 | 1640 |
| C | 1.1 | 8.2 | 680 |
| D | 1.0 | 8.6 | 1000 |
| E | 2.6 | 9.2 | 520 |
| F | 2.0 | 9.2 | 640 |

These results show that cationic starches obtainable by the present modification process are different from cationic starch obtainable by the method according to EP-A2-0 303 039, i.e. they have different physical properties.

We claim:

1. A process for modification of cationic starch, the cationic starch containing an anionic group, which comprises treating said cationic starch, in the presence of water, but in isolation from a fibre suspension of a pulp or paper production process, with an aluminum compound, with the proviso that if the aluminum compound is an alkali aluminate and the treatment is carried out in an alkaline medium at a temperature of between 5° and 40° C. no alkylene epoxide is present.

2. The process of claim 1 wherein the cationic starch is cooked in an aqueous solution and wherein the aluminium compound is added to the solution before, during, or after cooking.

3. The process of claim 1 wherein the aluminium compound is alum, aluminium chloride, aluminium nitrate, polyaluminium chloride, polyaluminium sulphate, a polyaluminium compound containing both chloride and sulphate ions, or polyaluminium silicate sulphate.

4. The process of claim 1, wherein the anionic group is a phosphate, a sulphate, or a carboxylate group.

5. Modified cationic starch prepared in accordance with the process of claim 1.

6. A retention agent which comprises the modified cationic starch of claim 5.

7. A method for improving retention and/or dewatering in papermaking, which comprises adding an aqueous solution of cationic starch to an aqueous suspension of lignocellulosic fibres, whereafter a sheet or web is formed of the fibres by dewatering the suspension, wherein an aluminium compound is added to the starch solution before the solution is added to the suspension, with the proviso that no epoxide is added to the solution if the aluminium compound is an alkali aluminate and the solution is alkaline and the temperature of the solution is between 5° and 40° C.

8. The method of claim 7 wherein the cationic starch contains an anionic group.

9. The method of claim 8 wherein the anionic group is a phosphate, a sulphate, or a carboxylate group.

10. The method of claim 7 wherein an aluminium compound is added directly to the suspension prior to, simultaneously with, or after addition of the starch solution to the suspension.

11. The method of claim 10 wherein the proportion between the aluminum added directly to the suspension and the aluminum added with the cationic starch is 1000:1–1:50.

12. A method comprising:

preparing a retention agent by treating cationic starch in the presence of water but in isolation from a fiber suspension of a paper production process with an aluminum compound, with the proviso that if the aluminum compound is an alkali aluminate and the treatment is carried out in an alkaline medium at a temperature of between about 5° to 40° C. no alkylene epoxide is present; and adding the retention agent to a fibre suspension.

* * * * *